United States Patent [19]

Agam et al.

[11] Patent Number: 5,438,199

[45] Date of Patent: Aug. 1, 1995

[54] THERMAL IMAGING APPARATUS WITH BIAS MODULATION

[75] Inventors: Uri Agam, Cote St. Luc; Gary Nicholson, Montreal, both of Canada

[73] Assignee: AlliedSignal Inc., Morris Township, Morris County, N.J.

[21] Appl. No.: 301,282

[22] Filed: Sep. 6, 1994

[51] Int. Cl.$^6$ .......................................... H01L 31/00
[52] U.S. Cl. ............................ 250/334; 250/338.4; 250/370.08
[58] Field of Search ............... 250/334, 338.1, 338.4, 250/370.08, 347

[56] References Cited

U.S. PATENT DOCUMENTS

| | | | |
|---|---|---|---|
| 3,995,159 | 11/1976 | Elliott | 250/370 |
| 4,347,530 | 8/1982 | Stetson | 358/113 |
| 4,377,747 | 3/1983 | Smith et al. | 250/370.08 |
| 4,467,201 | 8/1984 | Blackburn et al. | 250/370.08 X |
| 4,531,059 | 7/1985 | McCullough et al. | 250/370.08 X |
| 4,572,953 | 2/1986 | Elliott et al. | 250/338 |
| 4,679,063 | 7/1987 | White | 357/30 |
| 4,691,107 | 9/1987 | Elliott et al. | 250/338.4 X |
| 4,883,962 | 11/1989 | Elliott | 250/334 |
| 5,289,006 | 2/1994 | Gal | 250/334 |

FOREIGN PATENT DOCUMENTS

| | | | |
|---|---|---|---|
| 2819056 | 11/1979 | Germany | 250/334 |
| 39389 | 5/1975 | Israel | |
| 2-154123 | 6/1990 | Japan | 250/334 |
| 2119508 | 11/1983 | United Kingdom | |
| 2127619 | 4/1984 | United Kingdom | |
| 2165120 | 4/1986 | United Kingdom | 250/334 |

OTHER PUBLICATIONS

C. T. Elliott, D. Day and D. J. Wilson; "An Integrating Detector For Serial Scan Thermal Imaging"; Infrared Physics; pp. 31–42 vol. 22, 1982.

*Primary Examiner*—Carolyn E. Fields
*Assistant Examiner*—Edward J. Glick
*Attorney, Agent, or Firm*—Verne E. Kreger, Jr.

[57] ABSTRACT

A thermal imaging apparatus including a non-linear optomechanical scanner receiving radiation from a scene and directing it onto an image plane, the scanner defining a non-linear scan velocity in the image plane, a SPRITE detector disposed in the image plane including a first and second spaced contact and including apparatus for applying a bias voltage across the contacts in both directions thereby compensating for the non-linearity of the scanner and further taking into account the phase lag due to the detector and associated electronic circuitry and apparatus for filtering out the bias voltage from the output of the detector so that the output signal consists only of the signal due to photon flux.

8 Claims, 4 Drawing Sheets

THERMAL IMAGING APPARATUS WITH BIAS MODULATION

BACKGROUND OF THE INVENTION

1. Field of the Invention

The present invention relates to thermal imaging apparatus, and more particularly to thermal imaging apparatus employing non-linear scanning.

2. Description of Related Art

Various types of thermal imaging devices are known in the art. These include staring arrays, parallel scan devices and serial scan devices. Serial scan devices which employ a plurality of detectors arranged in a linear array and interconnected to provide time delay and integration are described in Israel Patent 39,389 issued to Laakmann.

The article "An Integrating Detector for Serial Scan Thermal Imaging," by C. T. Elliott, et al., *Infrared Physics*, Vol. 22, pages 31–42, 1982 describes the use of a Mercury Cadmium Telluride "SPRITE" detector for thermal imaging. The SPRITE detector is operative to perform time delay and integration within the detector material itself as controlled by the bias voltage applied across the two contacts of the SPRITE detector.

The SPRITE detector itself is described in U.K. Patents 2119508, published Oct. 26, 1983; 2127619, published Apr. 11, 1984; and U.S. Pat. Nos. 4,572,953, 4,679,063, and 4,691,107.

Many disadvantages exist when using a SPRITE in a thermal scanning device. Disadvantages include the fact that the SPRITE requires a constant current source; the SPRITE requires a constant scan speed; and to maintain optimum performance, the constant current source and scan speed must be closely matched. With these limitations, imaging apparatus using non-linear scanning systems have been impossible because the time delay and integration output of the SPRITE detector will not correspond to the changing speed of the scanning device. These disadvantages were overcome by a thermal imaging apparatus employing a SPRITE detector as described and claimed in U.S. Pat. No. 5,289,006 to Gal, which is incorporated by reference herein.

However, other disadvantages exist with such a thermal imaging device. The applied bias voltage to the detector is a function of both the detector and the scan speed, but one disadvantage is that the bias voltage may not be correctly aligned to the scanner velocity as a result of a phase lag caused by the scanner sensor, associated electronics and the detector time constant. The applied bias mis-alignment with the scanner velocity translates into a loss of output signal because of a reduction in the Modulation Transfer Frequency parameter of the SPRITE detector and a degradation in the signal-to-noise integration efficiency. The signal output of the SPRITE detector consists of the applied bias voltage at a reduced magnitude and the signal component resulting from the photon flux. Compensating for the detector rise time enables for the removal of the applied bias component from the detector output signal which if not removed may result in a signal where the photonic signal is much smaller than the applied bias voltage.

SUMMARY OF THE INVENTION

Accordingly, the present invention provides for a thermal imaging apparatus employing a SPRITE detector that overcomes the aforementioned disadvantages.

In accordance with a preferred embodiment of the present invention, there is provided a thermal imaging apparatus including a non-linear optomechanical scanner receiving radiation from a scene and directing it onto an image plane, the scanner defining a non-linear scan velocity in the image plane; a SPRITE detector disposed in the image plane including a first and second spaced contact; means for applying a bias voltage across the contacts in both directions; means for sensing the velocity of the scanner in real time as it scans across the image plane; a first synchronizing means for synchronizing the applied bias voltage across the contacts as a function of the sensed scan velocity, thereby compensating for the nonlinearity of the scanner and further taking into account the detector and the electronic circuitry; a second synchronizing means to properly phase synchronize a reference bias with the signal output of the SPRITE detector in order to match the applied bias component; means for adjusting the amplitude of the reference bias; and filtering means for extracting the true SPRITE photonic signal from the output of the detector.

Additional objects, advantages and novel features of the invention will be set forth in part in the description which follows, and in part will become apparent to those skilled in the art upon examination of the following or may be learned by practice of the invention.

BRIEF DESCRIPTION OF THE DRAWINGS

The above and other objects and advantages of this invention will be apparent on consideration of the following detailed description, taken in conjunction with the accompanying drawings, in which like reference characters refer to like parts throughout, and in which.

DETAILED DESCRIPTION OF THE PREFERRED EMBODIMENT OF THE INVENTION

The following detailed description, which describes only the preferred embodiment of the invention, is understood only to be an illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

Figure 1:
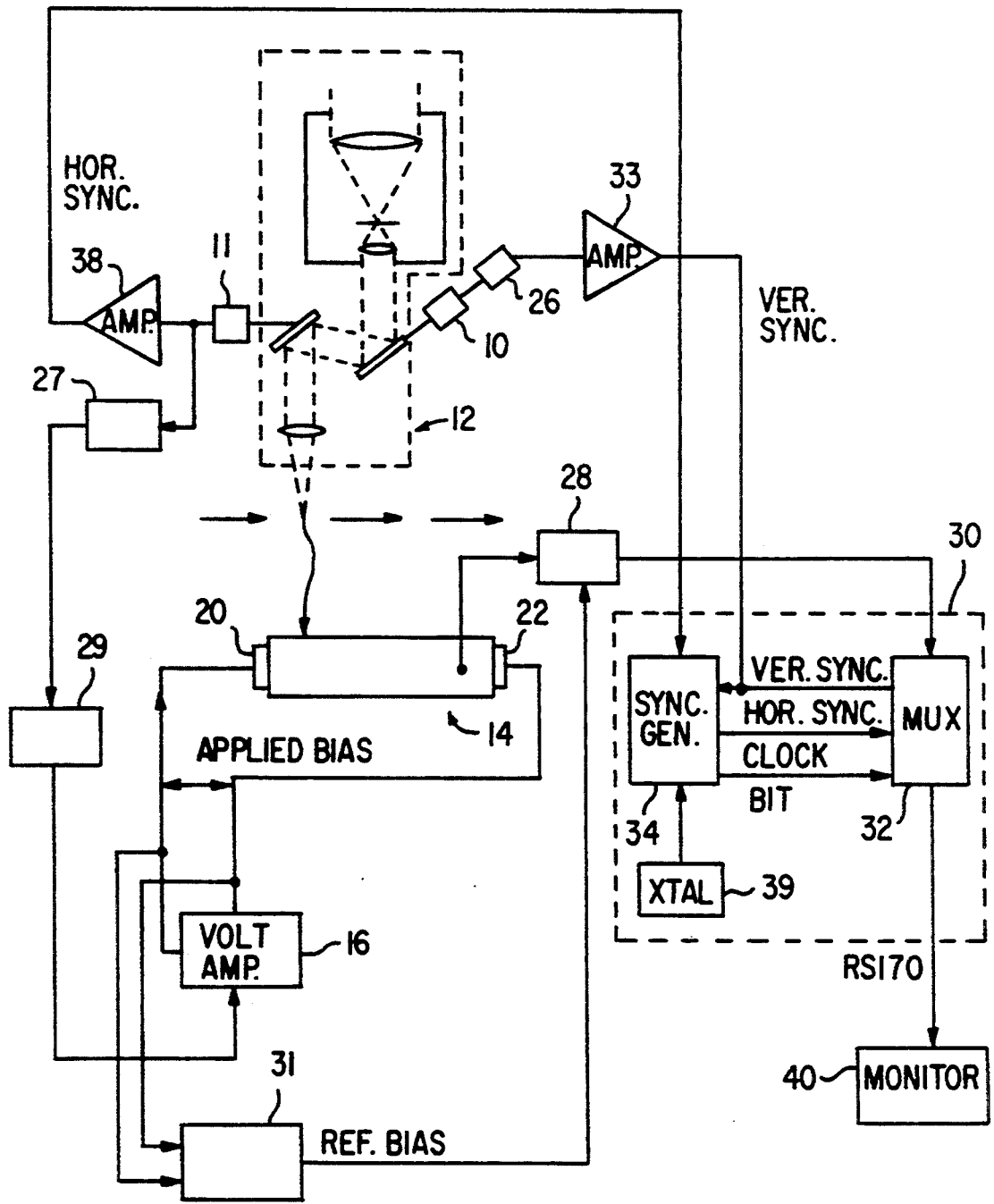
FIG. 1 is a simplified block diagram of a thermal imaging system employing a SPRITE detector with applied bias modulation.

FIG. 1 illustrates a simple block diagram of a thermal imaging system utilizing a SPRITE detector with applied bias modulation. The system illustrates a FLIR, by way of example only, but is applicable to any suitable type of scanner, such as those employed in medical imaging or in a scanning thermal imager. An optomechanical vertical scanner 10 and an optomechanical horizontal scanner 11, such as is described in U.S. Pat. No. 4,347,530 to Stetson, view a scene and optically direct an image of the scene via suitable scanning optics 12 onto a SPRITE detector 14. A SPRITE detector, as used throughout, is meant to designate an elongated detector which performs time delay and integration along its length. Preferred SPRITE detectors are described in the publications set forth hereinabove. Suitable SPRITE detectors are commercially available from GEC Marconi Infra-Red of the United Kingdom. As is well known, the time constant of the time delay and integration performed by the SPRITE detector is controlled by the bias voltage applied across the contacts 20 and 22 of the detector.

Figure 2:
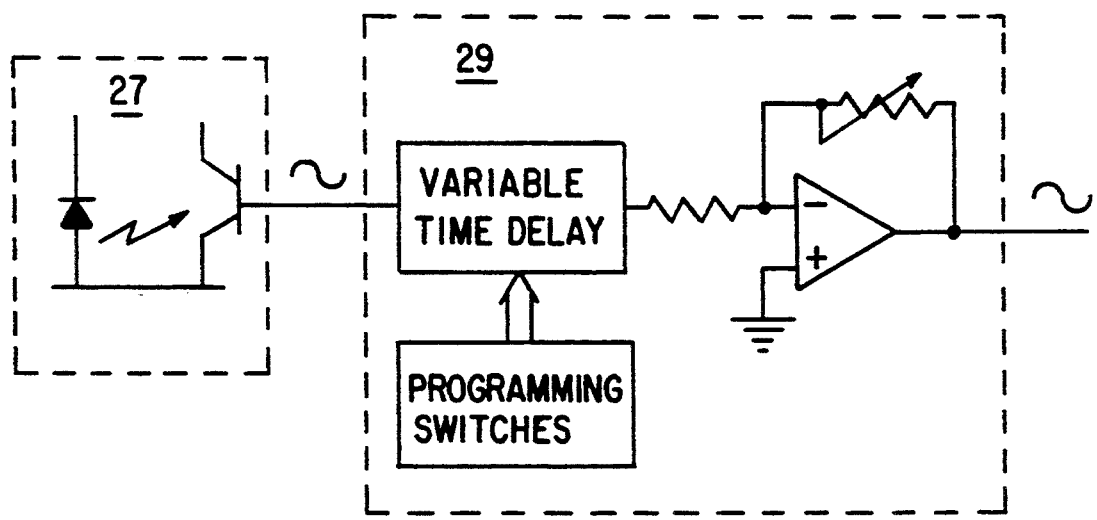
FIG. 2 is an electrical schematic of the de-phasing circuit.

In accordance with a preferred embodiment of the invention, the horizontal scanner 11 motion is translated into an electrical signal by a scanner motion detector 27. The phase of this output is adjusted by the de-phasing circuit 29, shown in FIG. 2. De-phasing circuit 29 provides the circuit means to ensure that the applied voltage bias is properly aligned to the scanner velocity taking into account any phase lag caused by the scanner sensor, associated electronics and the detector time constant. The scanner motion detector 27, such as an LED and opto transistor pair, produce a sinusoidal waveform that is a direct representation of the motion of horizontal scanner 11. The waveform is phase adjusted using variable time delay devices such as active or passive delay lines that have defined delay taps that are user selectable via a multiplexer. The appropriate multiplexer output is programmed, via switches, during system calibration. The time-delay waveform is then processed by a variable gain inverting amplifier. The output of de-phasing circuit 29 is directed to a voltage amplifier 16 as the applied bias voltage to the SPRITE detector 14.

Figure 3:
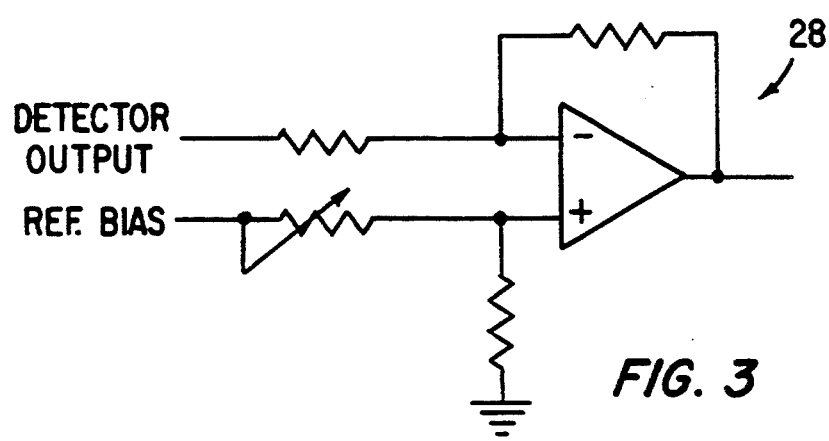
FIG. 3 is an electrical schematic of the signal extract circuit.

The output of the detector 14 is a composite of the applied bias voltage and the signal due to the photon flux on the detector 14. As shown in FIG. 1, the detector output is directed to a signal extract circuit 28 for extracting the photon flux signal. FIG. 3 illustrates one embodiment of signal extraction circuit 28 comprising a differential amplifier having as an input to the inverting terminal the output of detector 14. The other input into the differential amplifier is a reference bias signal that is in-phase and has the same amplitude as the applied bias voltage of the detector output.

Figure 4:
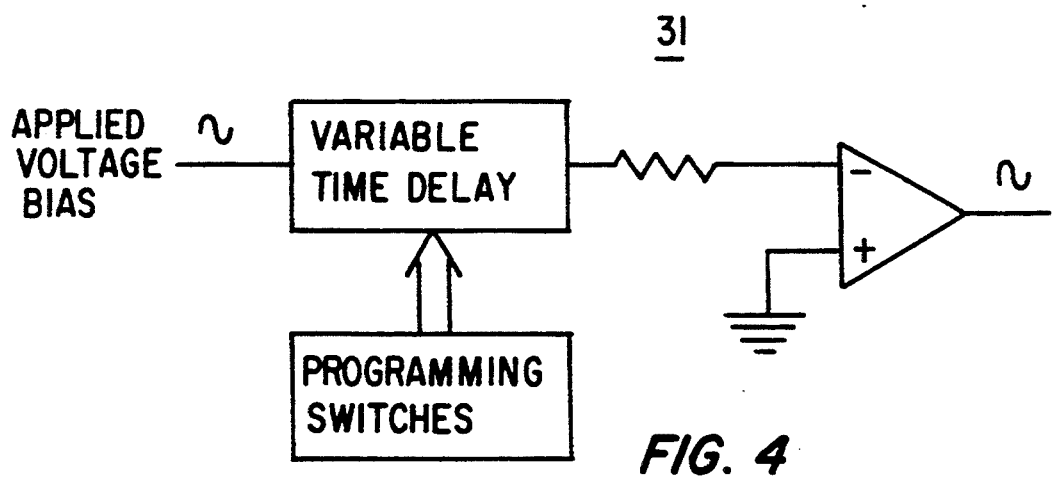
FIG. 4 is an electrical schematic of the anti-phasing circuit.

The reference bias signal originates from an anti-phasing circuit 31. Anti-phasing circuit 31 compensates for the finite time the excited carriers in detector 14 take to traverse the length of the bar. Circuit 31 ensures that the output of detector 14 and the reference bias are in phase. FIG. 4 illustrates one embodiment of anti-phasing circuit 31. The applied bias voltage is directed through a variable time delay device such as active or passive delay lines that have defined delay taps that are user selectable via a multiplexer. The appropriate multiplexer output is programmed, via switches, during system calibration. The reference bias is phase adjusted to match the output of detector 14. Additionally, the reference bias output is adjusted in magnitude by way of a variable gain inverting amplifier such that the reference bias matches the attenuation of the applied bias voltage that occurred through detector 14. The attenuation of the applied bias can be analyzed by considering the resistive divider effect of the total resistance of the SPRITE bar against the resistance of the SPRITE output. In any particular system, the magnitude would be adjusted to null out the applied bias portion of the SPRITE output. This adjustment would take place during system calibration.

Referring again to FIG. 3, the reference bias input to the differential amplifier is in-phase and equal in magnitude with the applied bias component of the detector output. The reference bias is subtracted from the detector output and the resultant output of signal extraction circuit 28 consists of only the signal due to photon flux.

Figure 3A:
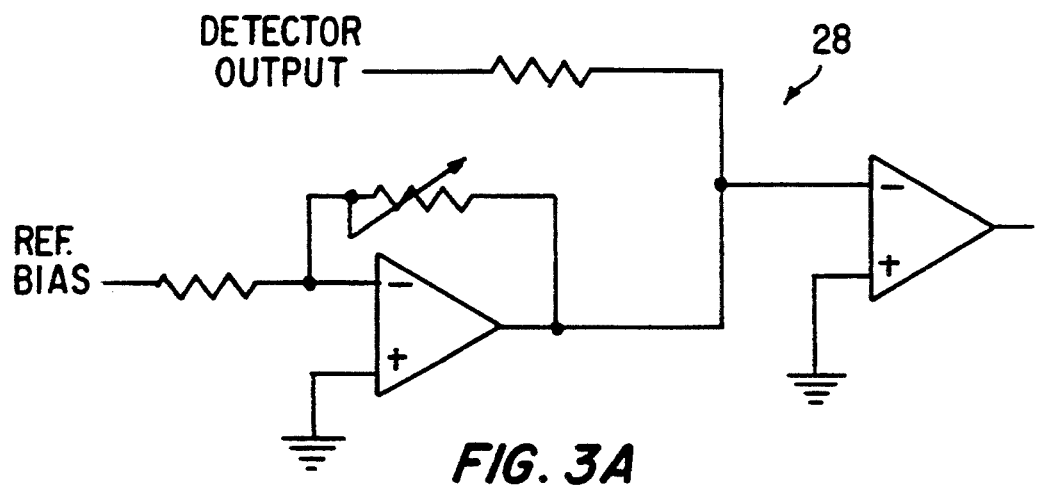
FIG. 3A is an alternate embodiment of the signal extract circuit.

FIG. 3A represents an alternate embodiment of signal extraction circuit 28. In this embodiment, the reference bias output of anti-phasing circuit 31 (which is in phase with the applied bias voltage) is input into the inverting terminal of a variable gain inverting amplifier. The inverted output is 180° out of phase with the output of detector 14 and both signals are summed to produce a net result of cancellation with the exception of the signal due to photon flux.

Referring again to FIG. 1, the signal due to photon flux is supplied to a video processing module 30. Video processor 30 comprises a multiplexer 32 which receives the photon flux signal and also receives a vertical sync input from indicator 26 via amplifier 33, a horizontal sync input and a clock bit input from sync generator 34. Sync generator 34 receives an oscillator input from a crystal oscillator 39, a horizontal sync input from horizontal scanner 11 via amplifier 38 and a vertical sync input from indicator 26. The output of multiplexer 32 may be supplied as a RS 170 standard signal to a monitor 40 or other utilization apparatus.

Figure 5:
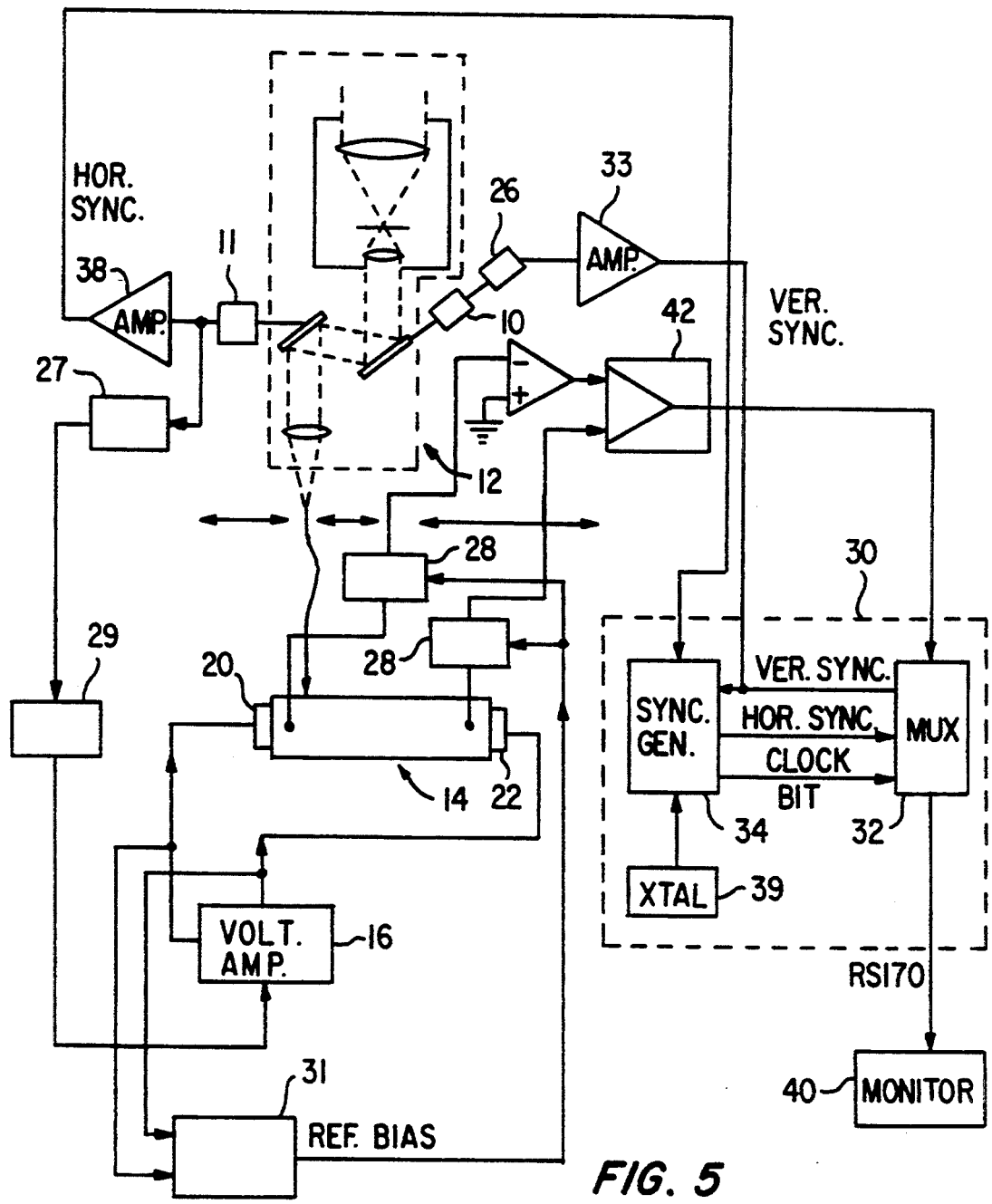
FIG. 5 is a simplified block diagram of an alternate embodiment of a thermal imaging system employing a SPRITE detector with applied bias modulation.

FIG. 5 represents an alternate embodiment of the invention which is suitable for scanning the SPRITE detector bidirectionally along its axis. If the scanner is swept bidirectionally then the applied bias must be able to change in polarity; therefore, the applied bias voltage must be bi-polar in nature such as a full sine wave bias. The signal from the detector is only present once integration has occurred over the length of the bar. Therefore, at each SPRITE output, the signal will either be on the positive slope of the applied bias or the negative slope. Each slope represents a different video line on the monitor. The output of the SPRITE detector 14 is derived from both ends of the elongated bar, and accordingly, a signal extraction circuit 28 must be connected to each output. The outputs of each signal extraction circuit 28, one of which is inverted, are input into a summing amplifier 42 to combine the SPRITE outputs into a single waveform.

It will be understood that the particular embodiments described above are only illustrative of the principles of the present invention, and that various modifications could be made by those skilled in the art without departing from the scope and spirit of the present invention, which is limited only by the claims that follow.

What is claimed is:

1. A thermal scanning apparatus comprising:
    a non-linear optomechanical scanner receiving radiation from a scene and directing it onto an image plane, said scanner defining a non-linear scan velocity in said image plane;
    a SPRITE detector disposed in said image plane and including first and second spaced contacts and means for applying a bias voltage across said contacts;
    means for sensing the velocity of said scanner in real time as it scans across said image plane; and a first synchronizing means for synchronizing the applied bias voltage across said contacts as a function of the sensed non-linear scan velocity, thereby to compensate for the non-linearity of the optomechanical scanner and to further compensate for phase lag due to said detector and associated electronic circuitry;

a second synchronizing means for phase synchronizing an output with the signal output of the SPRITE, said output of the second synchronizing means being referred to as the reference bias;

means for adjusting the amplitude of said reference bias; and filtering means for comparing said reference bias with said SPRITE output signal and filtering said applied bias voltage from said SPRITE output.

2. The thermal scanning apparatus of claim 1 wherein said applied bias voltage is an input to said second synchronizing means.

3. The thermal scanning apparatus of claim 1 wherein said first synchronizing means comprises an electrooptical sensor coupled to said scanner.

4. A thermal scanning apparatus comprising:

a non-linear optomechanical scanner receiving radiation from a scene and directing it onto an image plane, said scanner defining a non-linear scan velocity in the image plane;

an elongate detector disposed in said image plane and including means for performing time delay and integration therealong and voltage means for controlling the rate of time delay and integration;

means for sensing the velocity of the scanner in real time as it scans across the image plane;

means for dynamically varying the rate of time delay and integration of said elongate detector as a function of the sensed non-linear scan velocity, thereby to compensate for the non-linearity of the optomechanical scanner and to further compensate for the phase lag due to said detector and associated electronic circuitry;

means for generating a reference signal having the same phase and magnitude as said voltage means; and circuit means for comparing the output of said detector with said reference signal and extracting the photonic signal from said detector output.

5. The scanning apparatus of claim 4 wherein said circuit means comprises a differential amplifier having as one input the detector output and as another input said reference signal.

6. The scanning apparatus of claim 4 wherein said circuit means comprises an inverting amplifier having said reference signal as one input and a summing amplifier having on a common input the output of said elongate detector and the output of said inverting amplifier.

7. A thermal scanning apparatus comprising:

a non-linear optomechanical scanner receiving radiation from a scene and directing it onto an image plane, said scanner defining a non-linear scan velocity in the image plane;

a SPRITE detector disposed in said image plane and including first and second spaced contacts and means for applying a bi-polar bias voltage across said contacts;

means for sensing the velocity of the scanner in real time as it scans across the image plane; and a first synchronizing means for synchronizing the applied bias voltage across said contacts as a function of the sensed non-linear scan velocity, thereby to compensate for the non-linearity of the optomechanical scanner and to further compensate for the phase lag due to said detector and associated electronic circuitry;

a second synchronizing means to properly phase synchronize an output with the signal output of the SPRITE, the output of the second synchronizing means being referred to as the reference bias;

means for adjusting the amplitude of the reference bias;

filtering means for comparing said reference bias with said SPRITE output signal and filtering said applied bias voltage from said SPRITE output; and wherein said apparatus is suitable for use for scanning in either of two opposite directions.

8. A thermal scanning apparatus comprising:

a non-linear optomechanical scanner receiving radiation from a scene and directing it onto an image plane, said scanner defining a non-linear scan velocity in the image plane;

an elongate detector disposed in said image plane and including means for performing time delay and integration therealong and bi-polar voltage means for controlling the rate of time delay and integration;

means for sensing the velocity of the scanner in real time as it scans across the image plane;

means for dynamically varying the rate of time delay and integration of said elongate detector as a function of the sensed non-linear scan velocity, thereby to compensate for the non-linearity of the optomechanical scanner and to further compensate for the phase lag due to said detector and associated electronic circuitry;

means for generating a reference signal having the same phase and magnitude as said voltage means;

circuit means for comparing the output of said detector with said reference signal and extracting the photonic signal from said detector output, and wherein said apparatus is suitable for use for scanning in either of two opposite directions.

* * * * *